(12) United States Patent  
Franconi (10) Patent No.: US 7,669,830 B2
(45) Date of Patent: Mar. 2, 2010

(54) THREE POSITION SHUTOFF VALVE (75) Inventor: Robert Franconi, New Hartford, CT (US)

(73) Assignee: Honeywell International Inc., Morristown, NJ (US)

( * ) Notice: Subject to any disclaimer, the term of this patent is extended or adjusted under 35 U.S.C. 154(b) by 683 days.

(21) Appl. No.: 11/586,804

(22) Filed: Oct. 25, 2006

(65) Prior Publication Data

US 2008/0099703 A1 May 1, 2008

(51) Int. Cl.
*F16K 31/12* (2006.01)
(52) U.S. Cl. .................. 251/30.02; 251/28; 251/94
(58) Field of Classification Search .................. 251/25, 251/28, 30.01, 30.02, 94
See application file for complete search history.

(56) References Cited

U.S. PATENT DOCUMENTS

| | | | |
|---|---|---|---|
| 3,229,588 A | 1/1966 | Czernek | |
| 3,242,820 A | 3/1966 | Brandstadter | |
| 3,533,596 A | 10/1970 | Daume | |
| 3,687,160 A | 8/1972 | Erickson et al | |
| 3,865,128 A | 2/1975 | Zadoo | |
| 3,911,790 A | 10/1975 | Gaitten | |
| 4,103,864 A * | 8/1978 | Hagendorn | 251/63.6 |
| 4,320,872 A | 3/1982 | Frederick | |
| 4,460,324 A | 7/1984 | Van Appledorn | |
| 4,602,481 A | 7/1986 | Robinson | |
| 4,700,925 A * | 10/1987 | Russak | 251/73 |
| 4,735,056 A | 4/1988 | Goodman | |
| 5,197,285 A | 3/1993 | Dunwoody | |
| 5,301,919 A * | 4/1994 | May | 251/30.02 |
| 6,585,226 B2 * | 7/2003 | Fukano et al. | 251/28 |
| 6,634,395 B1 | 10/2003 | Mitchell | |
| 6,851,440 B2 * | 2/2005 | Kline | 137/1 |
| 6,871,668 B2 | 3/2005 | Moreno et al. | |
| 6,889,705 B2 | 5/2005 | Newman et al. | |

* cited by examiner

*Primary Examiner*—John K Fristoe, Jr.
(74) *Attorney, Agent, or Firm*—Ingrassia Fisher & Lorenz, P.C.

(57) ABSTRACT

A valve comprises a valve body and a shutoff assembly. The valve body includes an inlet, an outlet, and a fluid flow passage therebetween. The shutoff assembly includes a poppet and a piston. The poppet is movable between a closed position, a partially open position, and a full open position. The piston is disposed in the valve body adjacent to the poppet, and is moveable between a first position, in which the piston at least inhibits movement of the poppet from the closed position to the full open position, and a second position, in which the piston allows movement of the poppet from the closed position to the full open position.

17 Claims, 7 Drawing Sheets

THREE POSITION SHUTOFF VALVE

TECHNICAL FIELD

The present invention generally relates to a valve, and more particularly relates to a valve with an improved shutoff assembly.

BACKGROUND

Valves are used to control gases or other fluids in various types of apparatus and vehicles, such as aircraft. For example, valves may be used to control the supply of bleed air to aircraft anti-icing systems, among various other uses. In an aircraft anti-icing system, if too much or too little bleed air is supplied for a particular situation, then this can potentially allow liberation and ingestion of ice from the engine cowl into the engine inlet resulting in fan or compressor damage or allowing excessive heat buildup damaging the engine cowl structure, fuel economy, and/or engine performance.

Accordingly, there is a need for a valve with an improved shutoff assembly that can provide increased operability, fuel economy, engine performance and/or engine safety. The present invention addresses one or more of these needs.

BRIEF SUMMARY

An apparatus is provided for a valve. In one embodiment, and by way of example only, the valve comprises a valve body, a poppet, and a piston. The valve body includes an inlet, an outlet, and a fluid flow passage therebetween. The poppet is disposed in the valve body, and is movable between at least a closed position, a partially open position, and a full open position. When the poppet is in the closed position, fluid is at least substantially restricted from flowing through the fluid flow passage. When the poppet is in the partially open position, fluid is allowed to flow through the fluid flow passage at a first flow rate. When the poppet is in the full open position, fluid is allowed to flow through the fluid flow passage at a second flow rate that is greater than the first flow rate. The piston is disposed in the valve body adjacent to the poppet. The piston is moveable between a first position, in which the piston at least inhibits movement of the poppet from the closed position to the full open position, and a second position, in which the piston allows movement of the poppet from the closed position to the full open position.

In another embodiment, and by way of example only, the valve comprises a valve body, a poppet, a piston, a first chamber, and a second chamber. The valve body includes an inlet, an outlet, and a fluid flow passage therebetween. The poppet is disposed in the valve body, and is movable between at least a closed position, a partially open position, and a full open position. When the poppet is in the closed position, fluid is at least substantially restricted from flowing through the fluid flow passage. When the poppet is in the partially open position, fluid is allowed to flow through the fluid flow passage at a first flow rate. When the poppet is in the full open position, fluid is allowed to flow through the fluid flow passage at a second flow rate that is greater than the first flow rate. The piston is disposed in the valve body adjacent to the poppet. The piston is moveable between a first position, in which the piston at least inhibits movement of the poppet from the closed position to the full open position, and a second position, in which the piston allows movement of the poppet from the closed position to the full open position. The first chamber is formed between the valve body and the poppet, and is configured to receive pressurized fluid. The second chamber is formed between the valve body and the piston, and is configured to receive pressurized fluid.

An apparatus is provided for a shutoff assembly for a valve having a valve body including an inlet, an outlet, and a fluid flow passage therebetween. In one embodiment, and by way of example only, the shutoff assembly comprises a main body, a poppet, and a piston. The poppet is disposed in the main body, and is movable between at least a closed position, a partially open position, and a full open position. When the poppet is in the closed position, fluid is at least substantially restricted from flowing through the fluid flow passage. When the poppet is in the partially open position, fluid is allowed to flow through the fluid flow passage at a first flow rate. When the poppet is in the full open position, fluid is allowed to flow through the fluid flow passage at a second flow rate that is greater than the first flow rate. The piston is disposed in the main body adjacent to the poppet. The piston is moveable between a first position, in which the piston at least inhibits movement of the poppet from the closed position to the full open position, and a second position, in which the piston allows movement of the poppet from the closed position to the full open position.

BRIEF DESCRIPTION OF THE DRAWINGS

The present invention will hereinafter be described in conjunction with the following drawing figures, wherein like numerals denote like elements.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
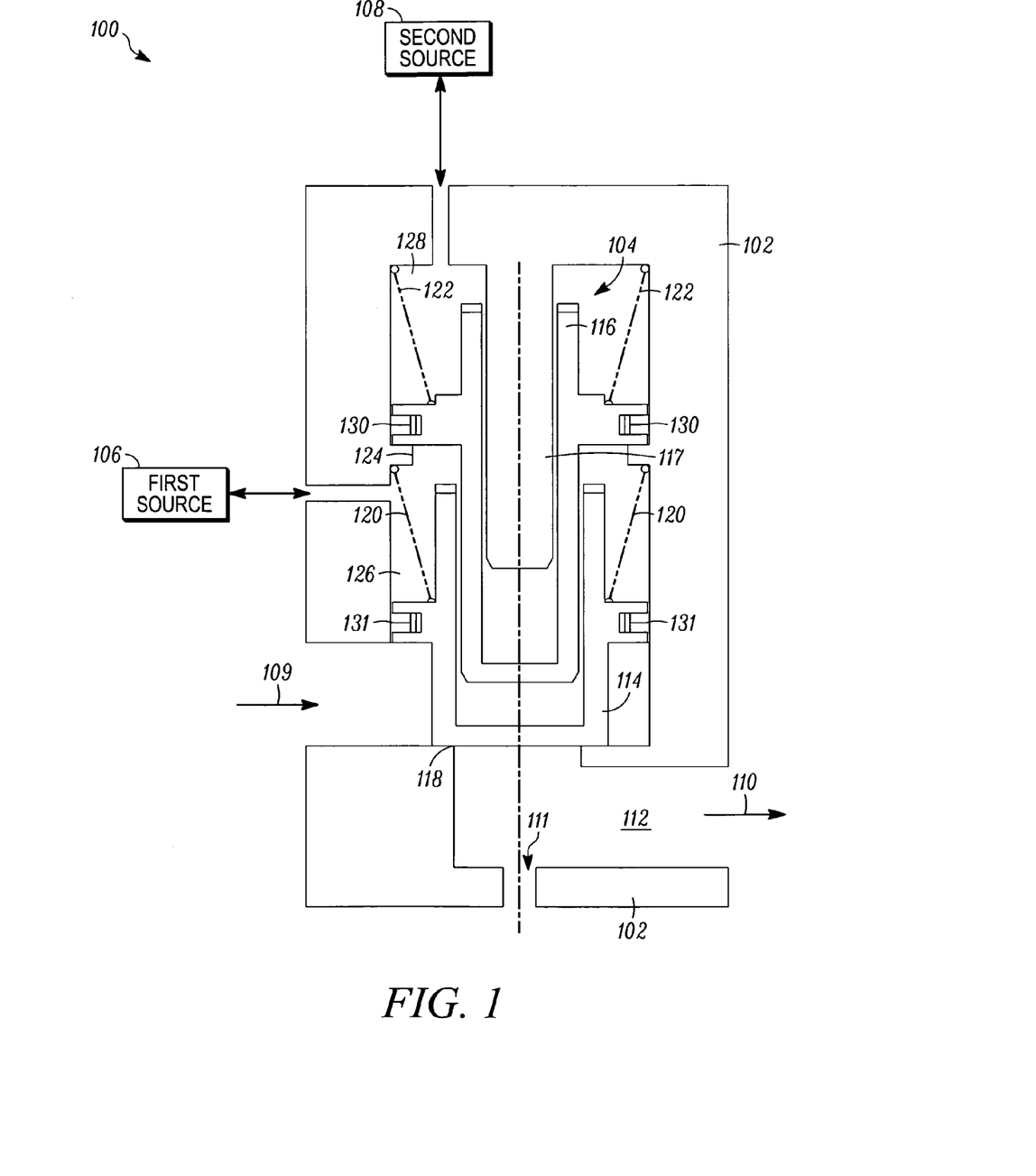
FIG. 1 depicts a schematic of a valve with a shutoff assembly.

FIG. 1 depicts a schematic of an exemplary embodiment of a valve 100. The valve 100 includes a valve body 102 and a shutoff assembly 104, and preferably also includes a first pressurized fluid source 106 and a second pressurized fluid source 108. The valve body 102 includes an inlet 109, an outlet 110, and a fluid flow passage 112 therebetween. The valve body 102 may also include a pneumatic pressure sense port 111. The pneumatic pressure sense port 111, if included, is in fluid communication with the fluid flow passage 112. In this regard, the pneumatic pressure sense port 111 is configured to receive a non-illustrated pressure sensor for sensing fluid pressure downstream of the below-mentioned poppet 114.

The shutoff assembly 104 includes a poppet 114, a piston 116, a guide 117, a poppet spring 120, a piston spring 122, a plurality of piston seals 130, and a plurality of poppet seals 131. The poppet 114 is preferably disposed in the valve body 102, and is movable between at least a closed position, a partially open position, and a full open position.

FIGS. 2-6 depict various embodiments of the valve 100, shown with the poppet 114 in these various positions and, as will be discussed further below, shown with specific embodiments of the first and second pressurized fluid sources 106, 108 of pressurized fluid.

In particular, when the poppet 114 is in the closed position, which is the position depicted in FIGS. 1, 2, 5, and 6, the poppet 114 seats against a poppet seat 118 formed in the valve body 102, and at least substantially restricts fluid flow through the fluid flow passage 112. When the poppet 114 is in the partially open position, which is the position depicted in FIG. 4, fluid is allowed to flow through the fluid flow passage 112 at a first flow rate. When the poppet 114 is in the full open position, which is the position depicted in FIG. 3, fluid is allowed to flow through the fluid flow passage 112 at a second flow rate that is greater than the first flow rate. The poppet 114 can be moved from the closed position to either the full open position or the partially open position at least in part by inlet pressure supplied against the poppet 114 through the inlet 109.

Figure 2:
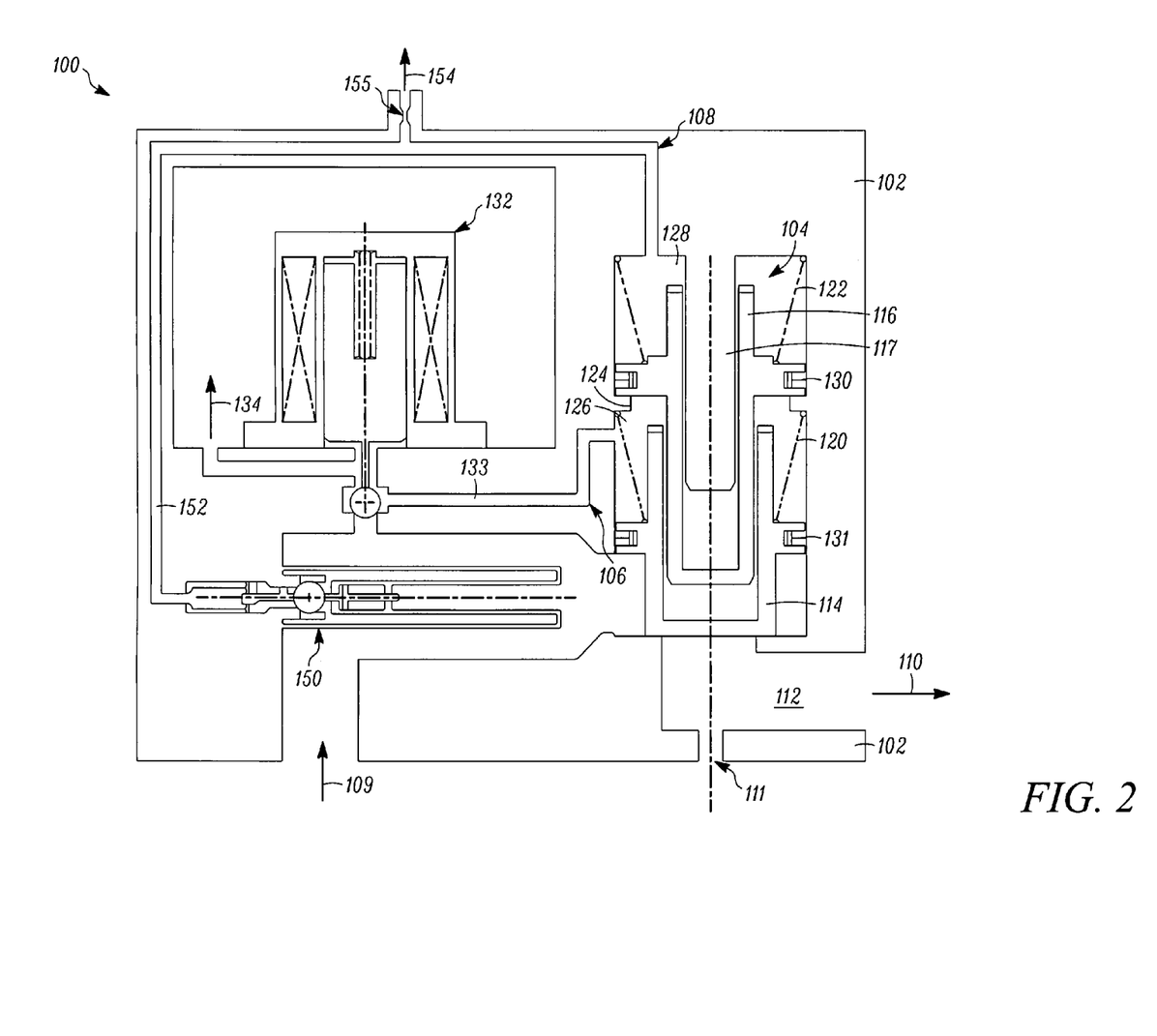
FIG. 2 depicts a schematic of one embodiment of the valve of FIG. 1, shown in a closed position without inlet pressure.
Figure 3:
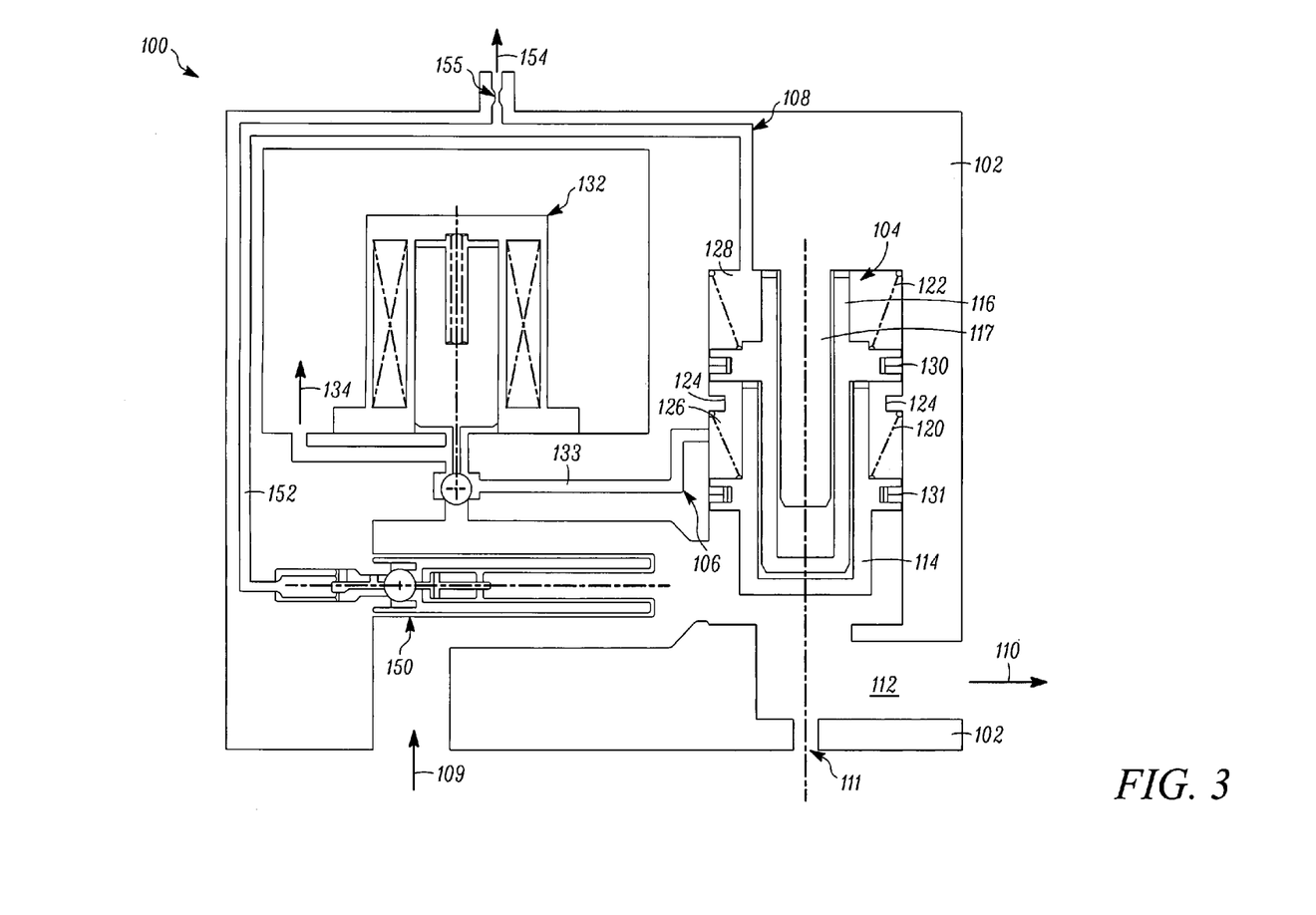
FIG. 3 depicts a schematic of the valve of FIG. 2, shown in a full open position with inlet pressure.

The piston 116 is movably disposed in the valve body 102, adjacent to the poppet 114. The piston 116 surrounds the guide 117 and is slidably moveable thereon between a first position and a second position. When the piston 116 is in the first position, as depicted in FIGS. 1, 2, 4, and 6, the piston 116 inhibits movement of the poppet 114 from the closed position to the full open position. When the piston 116 is in the second position, as depicted in FIGS. 3 and 5, the piston 116 allows movement of the poppet 114 from the closed position to the full open position. A piston stop 124 is coupled to the piston 116, and is configured to stop the piston 116 when the piston 116 reaches the first position. In a preferred embodiment depicted in FIGS. 1-6, the piston stop 124 is formed in the valve body 102. However, it will be appreciated that in other embodiments the piston stop 124 may take any one of numerous different configurations.

As shown in FIGS. 1-6, the guide 117 is preferably disposed in the center of the shutoff assembly 104, aligns with the center of both the poppet 114 and the piston 116, and guides both the poppet 114 and the piston 116. However, it will be appreciated that in various embodiments the guide 117 may include any number of guides in any one of a number of different configurations.

As mentioned above, the shutoff assembly 104 also preferably includes a poppet spring 120 and a piston spring 122. The poppet spring 120 is disposed adjacent to the poppet 114, and is configured to exert a poppet spring force against the poppet 114 toward the closed position. The piston spring 122 is disposed adjacent to the piston 116, and is configured to exert a piston spring force against the piston 116 toward the first position.

A first chamber 126 is formed between the valve body 102 and the poppet 114. The first chamber 126 is configured to receive pressurized fluid from the first pressurized fluid source 106. As will be described further below, when pressurized fluid is supplied to the first chamber 126, the pressurized fluid supplies a force that moves the piston 116 to the second position, and the poppet 114 to the closed position.

A second chamber 128 is formed between the valve body 102 and the piston 116. The second chamber 128 is configured to receive pressurized fluid from the second pressurized fluid source 108. As will be described further below, when pressurized fluid is supplied to the second chamber 128, the pressurized fluid supplies a force that moves the piston 116 to the first position, and moves the poppet 114 from the full open position to the partially open position and/or restricts movement of the poppet 114 from the closed position to the full open position.

A plurality of piston seals 130 and poppet seals 131 are disposed proximate the piston 116 and the poppet 114, respectively, and are configured to at least facilitate preventing inadvertent fluid leakage into, out of, or between the first chamber 126 and the second chamber 128.

As depicted in FIGS. 2-6, the first pressurized fluid source 106 preferably includes a control valve 132, a first conduit 133, and a first vent 134. The control valve 132 is configured to selectively supply pressurized fluid to the first chamber 126 via the first conduit 133, and to vent the first chamber 126 via the first vent 134.

Figure 6:
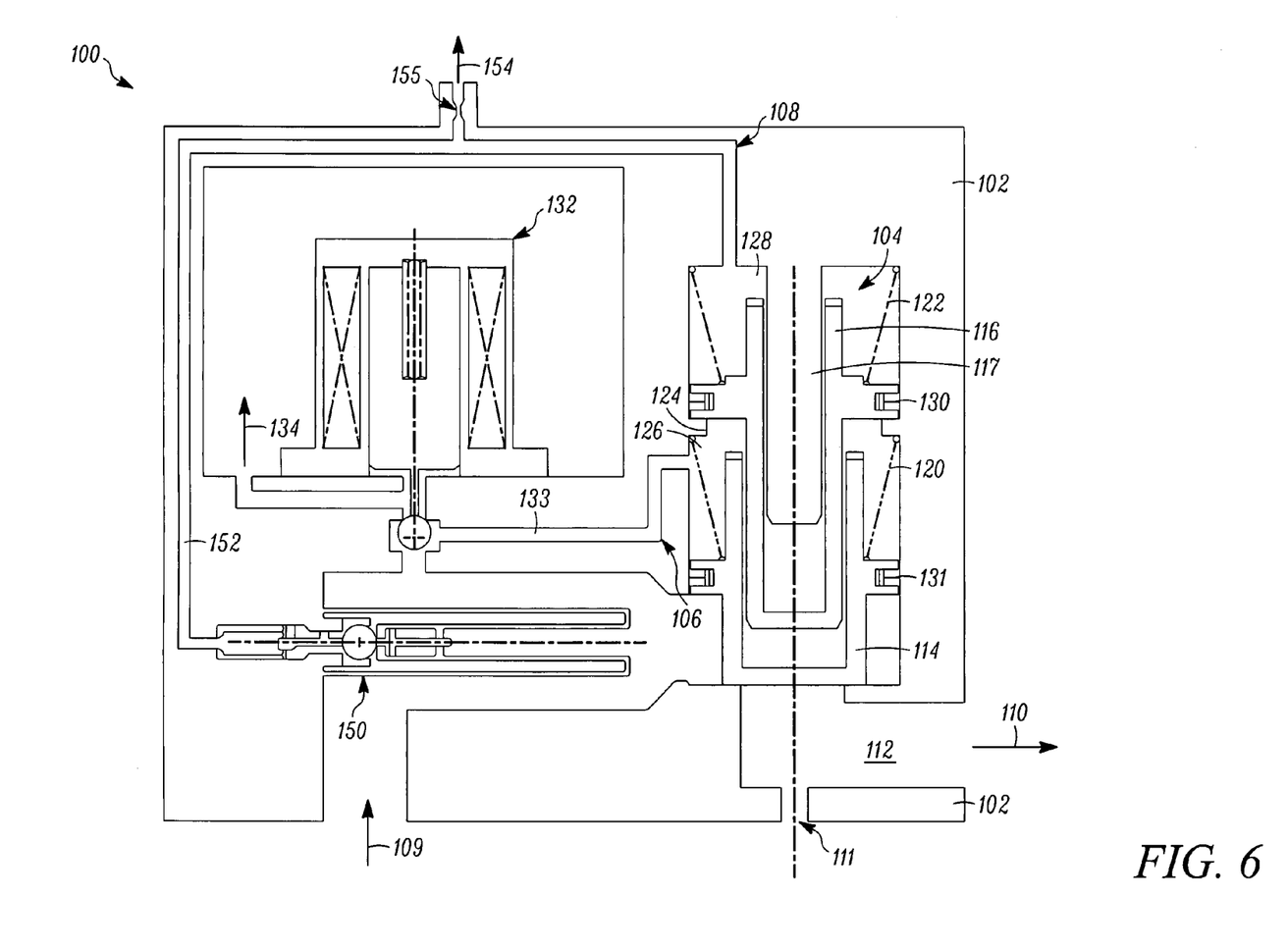
FIG. 6 depicts a schematic of the valve of FIG. 2, shown in a closed position in which a first chamber and a second chamber of the shutoff assembly have both received a flow of pressurized fluid.
Figure 7:
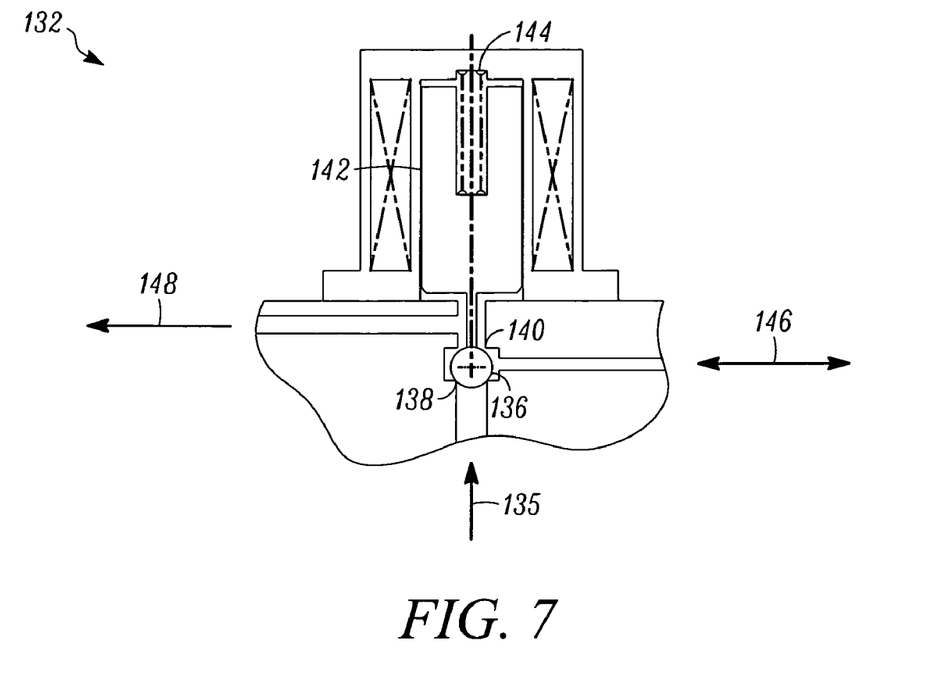
FIG. 7 depicts a close-up schematic of a control valve that can be used in connection with the valve of FIG. 2.

As shown in the close-up view of FIG. 7, the control valve 132 preferably includes an inlet port 135, a valve element 136, an inlet seat 138, a vent seat 140, an armature 142, a solenoid spring 144, a control port 146 coupled to the first conduit 133, and a vent port 148 coupled to the first vent 134. The inlet port 135 allows a range of inlet pressure to be applied against the valve element 136. In a preferred embodiment, the valve element 136 is a silicon nitride ball; however, it will be appreciated that any one of numerous different types of valve elements 136 can be used. Regardless of its particular makeup, the valve element 136 is configured to move between a first position (depicted in FIGS. 2-4 and 7), in which the valve element 136 rests against the inlet seat 138, and a second position (depicted in FIGS. 5 and 6), in which the valve element 136 rests against the vent seat 140, as set forth in greater detail below.

When the control valve 132 is de-energized (as depicted in FIGS. 2-4 and 7), the solenoid spring 144 is configured to exert a spring force against the valve element 136 that urges the armature 142 and the valve element 136 against the inlet seat 138 over the range of opposing inlet pressure provided through the inlet port 135. Accordingly, the inlet port 135 is blocked, and the control port 146 is vented, via the vent port 148, to the first vent 134. As a result, the first chamber 126 is also vented to the first vent 134.

Figure 5:
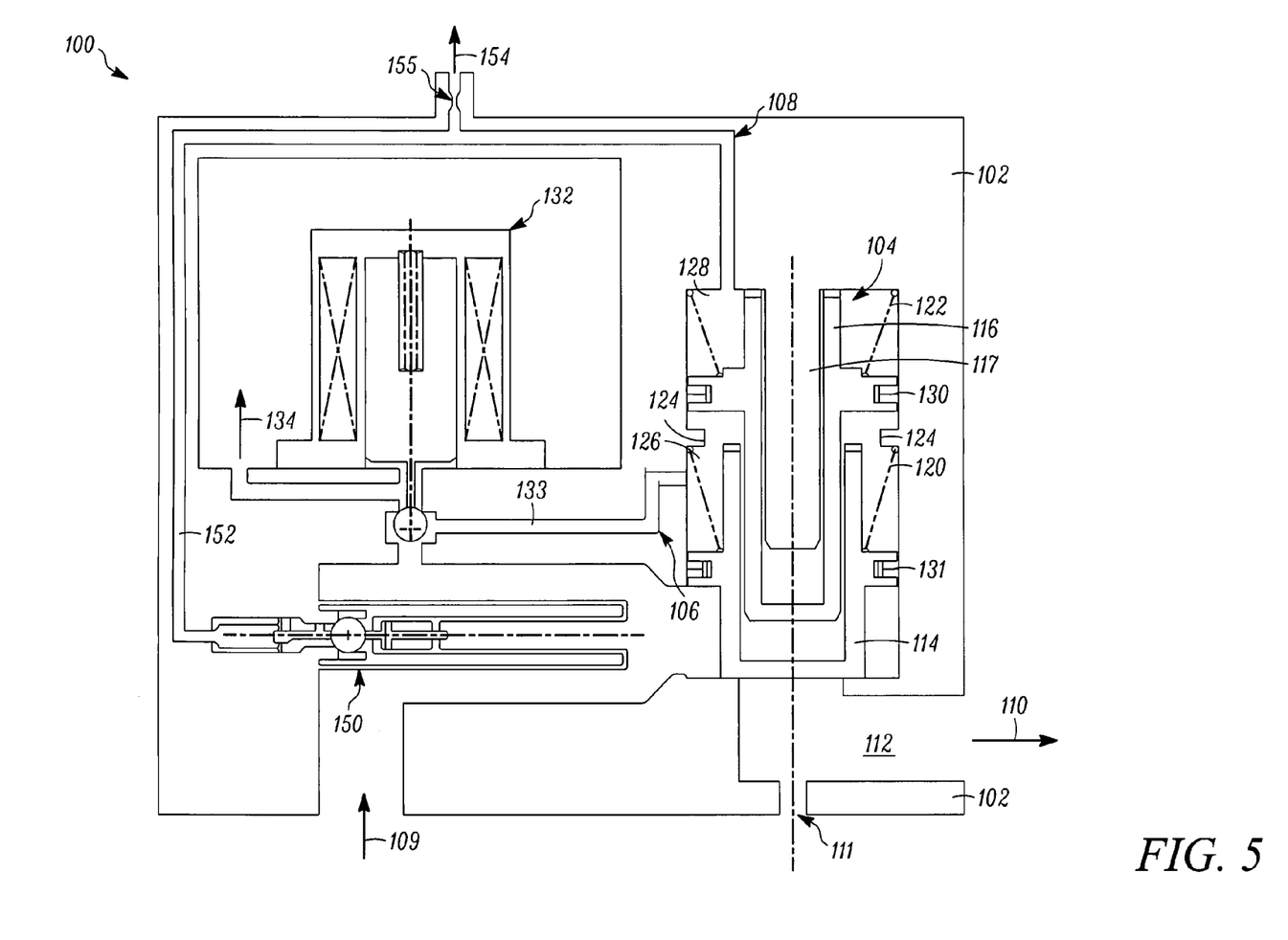
FIG. 5 depicts a schematic of the valve of FIG. 2, shown in a closed position in which a first chamber of the shutoff assembly has received a flow of pressurized fluid.

Conversely, when the control valve 132 is energized (as depicted in FIGS. 5 and 6), an electromagnetic force overcomes the force applied by the solenoid spring 144, thereby moving the valve element 136 to the vent seat 140. Accordingly, the vent port 148 is blocked, and pressurized fluid is allowed to flow through the control port 146, and ultimately to the first chamber 126 via the first conduit 133.

Figure 8:
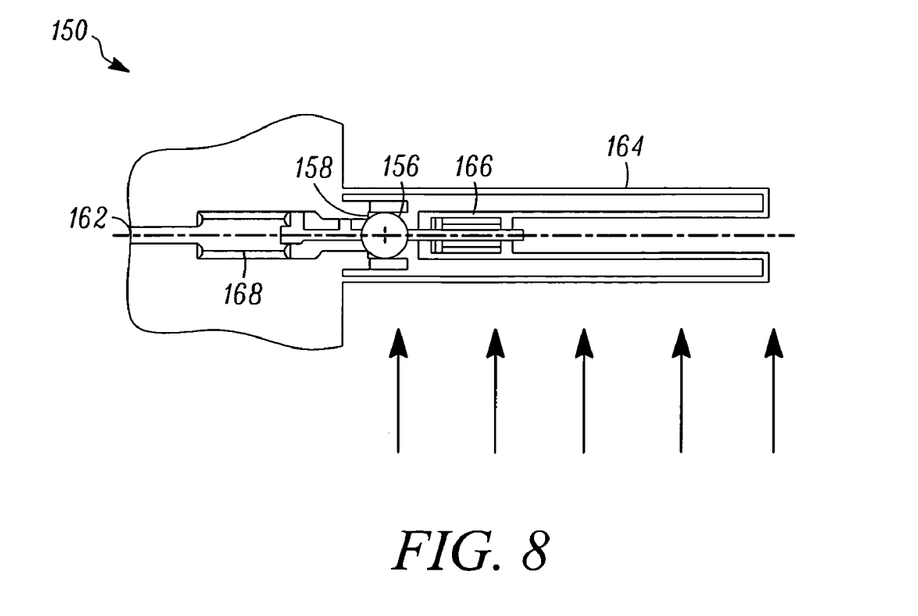
FIG. 8 depicts a close-up schematic of a thermostat assembly that can be used in connection with the valve of FIG. 2.

Turning now to a description of the second pressurized fluid source 108, as depicted in FIGS. 2-6, the second pressurized fluid source 108 preferably includes a thermostat assembly 150, a second conduit 152, and a second vent 154. The thermostat assembly 150 is configured to selectively supply pressurized fluid to the second chamber 128 via the second conduit 152 and, as shown in the close-up view of FIG. 8, includes a thermostat valve element 156, a thermostat valve element seat 158, non-illustrated cross holes configured to receive a supply of pressurized fluid into the thermostat assembly 150, a control port 162 coupled to the second conduit 152, a thermal sense device 164 (which includes a bimetallic stack in a preferred embodiment, but which can take any one of numerous different configurations), an overtravel spring and pin device 166, and an opening spring and pintle device 168. The thermostat valve element 156 is preferably a silicon nitride ball; however, it will be appreciated that any one of numerous different types of thermostat elements 156 can be used. Regardless of its particular makeup, the thermostat valve element 156 is configured to move between a first position (depicted in FIGS. 2, 3, 5, and 8), in which the thermostat valve element 156 seats against the thermostat valve element seat 158, and a second position (depicted in FIGS. 4 and 6), in which the thermostat valve element 156 is at least partially off the thermostat valve element seat 158, as set forth in greater detail below.

The thermostat valve element 156 preferably remains in the first position at room temperature, and when the inlet fluid temperature does not exceed the predetermined temperature. While the thermostat valve element 156 is in the first position, pressurized fluid is blocked from flowing from the inlet port 109 to the control port 162. Accordingly, pressurized fluid is blocked from flowing to the second chamber 128.

Conversely, at inlet fluid temperatures that exceed the predetermined temperature, the thermal sense device 164 expands, thereby moving the overtravel spring and pin device 166 and, with it, the thermostat valve element 156, preferably with the help of the opening spring and pintle device 168. Once the inlet fluid temperature reaches a predetermined temperature for the particular valve 100, the thermostat valve element 156 thereby moves to its second position, at least partially off the thermostat valve element seat 158. Accordingly, pressurized fluid is permitted to flow to the control port 162, and ultimately to the second chamber 128 via the second conduit 152. Similarly, if the inlet fluid temperature is reduced below the predetermined temperature, the thermal sense device 164 contracts, moving the thermostat valve element 156 back to its first position on the thermostat valve element seat 158, and blocking pressurized fluid from flowing to the second chamber 128.

Having generally described the valve 100, a more detailed description of the operation of a particular embodiment of the valve 100 will now be described, assuming that the poppet 114 is initially in the closed position of FIG. 2, in which there is little or no inlet pressure, the inlet fluid temperature does not exceed the predetermined temperature, and the control valve 132 is de-energized. In this position, the poppet 114 is spring loaded against the poppet seat 118 by the poppet spring 120, and the piston 116 is spring loaded against the piston stop 124 by the piston spring 122. The first chamber 126 is vented to atmospheric pressure by means of the control valve 132, which is vented, with the armature 142 and the valve element 136 spring loaded against the inlet seat 138. The second chamber 128 is vented to atmospheric pressure by means of the thermostat assembly 150, which is in the first, or closed, position, with the thermostat valve element 156 spring loaded against the thermostat valve element seat 158 and through the vent orifice 155 to atmosphere 154.

Once sufficient inlet pressure is applied through the inlet 109, the poppet 114 begins to open against the poppet spring 120, toward an open position. As the poppet 114 reaches a specified point (corresponding with approximately a fifty percent flow area in a preferred embodiment, although the specified point can vary in different embodiments), the poppet 114 contacts the piston 116, thereby at least facilitating movement of the piston 116 against the piston spring 122 to its second position. In a preferred embodiment, the region of contact between the poppet 114 and the piston 116 is preferably designed to accommodate spring forces and friction, so that the poppet 114 reaches the full open position by the time the inlet pressure reaches approximately 13 psig, or any one of numerous other predetermined inlet pressure points for the particular valve 100. Specifically, FIG. 3 shows the valve 100 with the poppet 114 in the full open position and the piston 116 in its second position, corresponding with an inlet pressure of at least 13 psig, the control valve 132 de-energized, and the thermostat assembly 150 not activated (for example, corresponding with a temperature of less than 800° F. in a preferred embodiment, although the temperature range for the thermostat assembly 150 will vary in various embodiments).

As the inlet fluid temperature increases, the thermostat sense device 164 expands. Once the inlet fluid temperature reaches the predetermined temperature, the thermostat valve element 156 moves to its second position, and pressurized fluid is supplied to the second chamber 128 via the second conduit 152. Once any force balance and leakage through orifice 155 is overcome, the pressurized fluid in the second chamber 128 will be sufficient to allow the piston spring 122 to begin moving the piston 116 back to its first position, thereby moving the poppet 114 from the full open position to the partially open position. The poppet 114 will continue to close as the inlet fluid temperature rises (and as the pressurized fluid flow to the second chamber 128 thereby increases) until the piston 116 contacts the piston stop 124, thereby reaching its first position, at which point the poppet 114 is in the partially open position and movement of the piston 116 and the poppet 114 stops.

Figure 4:
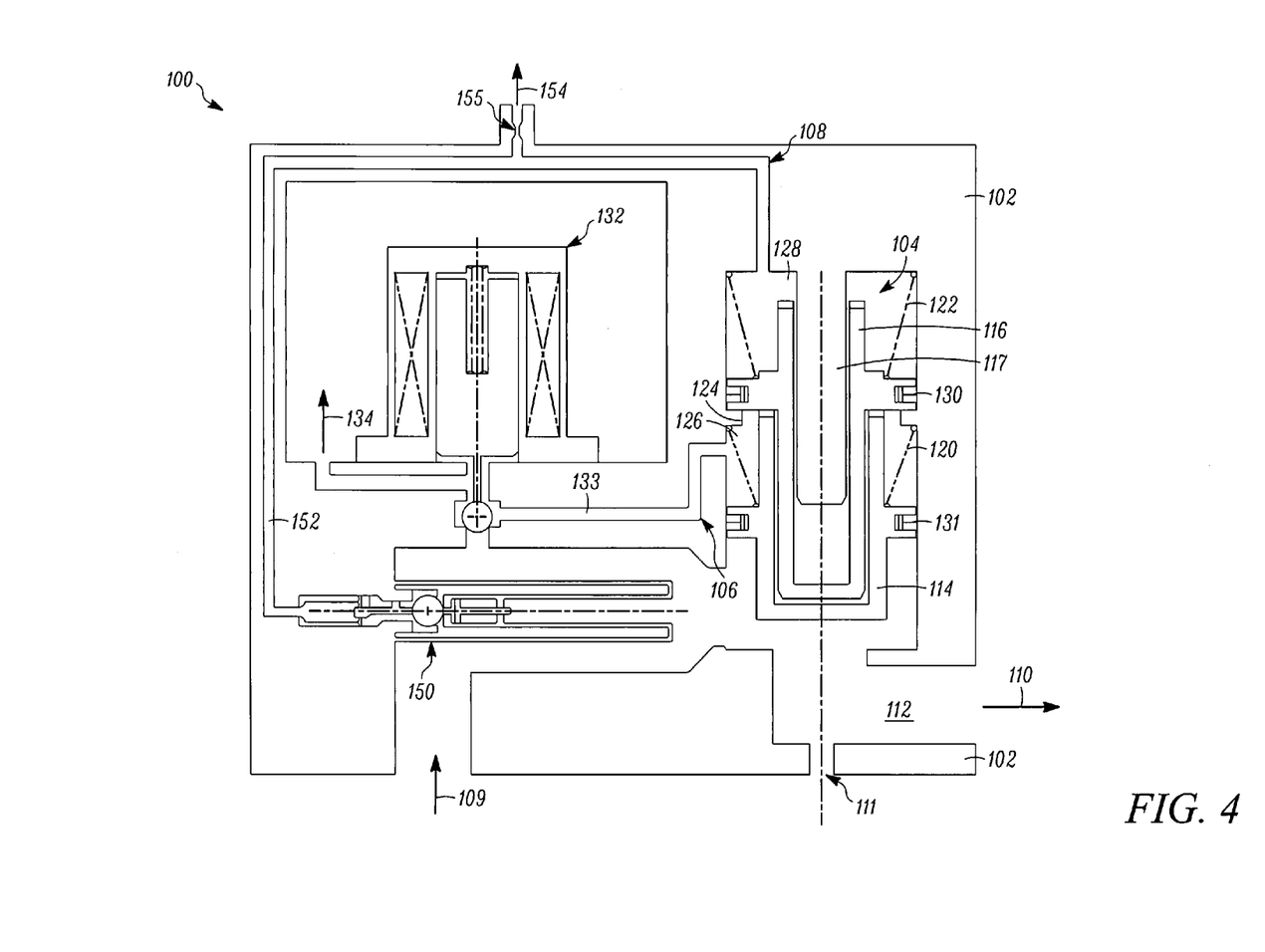
FIG. 4 depicts a schematic of the valve of FIG. 2, shown in a partially open position, in which a second chamber of the shutoff assembly has received a flow of pressurized fluid.

Specifically, FIG. 4 depicts this situation, with an inlet fluid temperature that exceeds the predetermined temperature, while the inlet pressure is applied through the inlet 109, and the control valve 132 is de-energized. As shown in FIG. 4, the piston 116 is in its first position, and the poppet 114 is in the partially open position. In a preferred embodiment, there is approximately a fifty percent flow area through the fluid flow passage 112 when the poppet 114 is in this partially open position; however, it will be appreciated that in various embodiments the flow area corresponding with this partially open position may vary, and/or that there may be multiple partially open positions for the poppet 114, each having a different flow area. Conversely, if the inlet fluid temperature is reduced below the predetermined temperature, the thermal sense device 164 contracts, the thermostat valve element 156 moves back to its first position, and pressurized fluid flow to the second chamber 128 is reduced, allowing the piston spring 122 to begin moving the piston 116 toward its second position, and thereby allowing movement of the poppet 114 to the fully open position.

Alternatively, if the control valve 132 is energized (as shown in FIG. 5, under conditions in which the inlet pressure is applied through the inlet 109, and the inlet fluid temperature does not exceed the predetermined temperature), the valve element 136 moves to its second position, thereby allowing pressurized fluid to flow from the first pressurized fluid source 106, through the first conduit 133, to the first chamber 126. A resulting imbalance in the force applied by the poppet spring 120 moves the poppet 114 toward the closed position. As the poppet 114 moves toward the closed position, an additional closing force margin is obtained from a pressure differential between the inlet pressure in the first chamber 126 versus the outlet pressure supplied by the fluid flow passage 112. This pressure differential helps to ensure that the poppet 114 is held with sufficient force against the poppet seat 118, and to thereby minimize potential leakage. In addition, the pressurized fluid in the first chamber 126 also preferably moves the piston 116 to its second position. Conversely, if the control valve 132 is subsequently de-energized, the valve element 136 moves back to the first position, thereby reducing the pressurized fluid flow to the first chamber 126, and thereby at least facilitating movement of the poppet 114 to either the partially open position or the full open position.

Alternatively, under conditions in which the control valve 132 is energized, the inlet pressure is applied through the inlet 109, and the inlet fluid temperature exceeds the predetermined temperature (as shown in FIG. 6), then both (i) the valve element 136 moves to its second position, thereby allowing pressurized fluid to flow through the first conduit 133 to the first chamber 126; and (ii) the thermostat valve element 156 moves to its second position, thereby allowing pressurized fluid to flow through the second conduit 152 to the second chamber 128. Similar to the discussion above with respect to FIG. 5, the poppet 114 is moved to the closed position, as shown in FIG. 6. However, the piston 116 preferably ends up in its first position, also as shown in FIG. 6, due to the combined forces of the piston spring 122 and the pressurized fluid in the second chamber 128.

As shown in FIGS. 5 and 6, the control valve 132 preferably has full authority to close the poppet 114 from either the full open position or the partially open position. For example, the poppet 114 is preferably moved to the closed position when the control valve 132 is energized, regardless of the inlet fluid temperature, and regardless of the position of the piston 116. Accordingly, while the poppet 114 is at least partially controlled by the piston 116 in moving between the full open position and the partially open position when the inlet fluid temperature changes, the poppet 114 is also at least partially independent of the piston 116 in moving from the full open position or the partially open position to the closed position, for example when the control valve 132 is energized.

The valve 100 and the shutoff assembly 104 can be effective at increasing flexibility, fuel economy, and/or engine performance, for example in an anti-icing system on an aircraft. For example, by at least facilitating movement of the poppet 114 between the full open and partially open positions, the thermostat assembly 150 can be configured to increase bleed air flow to the anti-icing system when temperatures are in a lower range and more bleed air is therefore needed, and to decrease bleed air flow to the anti-icing system when temperatures increase and therefore less bleed air is needed. Similarly, the control valve 132 can be energized to move the poppet 114 to the closed position in situations or circumstances, such as warm weather, in which bleed air is not needed for the anti-icing system. As a result, the valve 100 and the shutoff assembly 104 can help prevent the flow of excess or unneeded bleed air to the anti-icing system, thereby improving flexibility, fuel economy, and engine performance. It will similarly be appreciated that the valve 100 and the shutoff assembly 104 can be implemented with similar and/or other advantages in any one of numerous other types of systems.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A valve comprising:
   a valve body including an inlet, an outlet, and a fluid flow passage therebetween;
   a poppet disposed in the valve body and movable between at least:
      a closed position, in which fluid is at least substantially restricted from flowing through the fluid flow passage;
      a partially open position, in which fluid is allowed to flow through the fluid flow passage at a first flow rate; and
      a full open position, in which fluid is allowed to flow through the fluid flow passage at a second flow rate that is greater than the first flow rate;
   a piston disposed in the valve body adjacent to the poppet, the piston moveable between a first position, in which the piston at least inhibits movement of the poppet from the closed position to the full open position, and a second position, in which the piston allows movement of the poppet from the closed position to the full open position;
   a poppet spring disposed adjacent to the poppet, the poppet spring configured to exert a poppet spring force against the poppet toward the closed position; and
   a piston spring disposed adjacent to the piston, the piston spring configured to exert a piston spring force against the piston toward the first position.

2. The valve of claim 1, further comprising:
   a poppet seat disposed in the valve body and configured to seat the poppet when the poppet approaches the closed position.

3. The valve of claim 1, further comprising:
   a piston stop coupled to the piston and configured to stop the piston when the piston has reached the first position.

4. The valve of claim 1, wherein the valve body further includes a pneumatic pressure sense port configured to receive a pressure sensor for sensing fluid pressure downstream of the poppet.

5. The valve of claim 1, further comprising:
   a chamber formed between the valve body and the poppet, the chamber configured to receive pressurized fluid.

6. The valve of claim 5, further comprising:
   a second chamber formed between the valve body and the piston, the second chamber configured to receive pressurized fluid.

7. The valve of claim 6, further comprising:
   a plurality of seals disposed proximate the piston and the poppet, the plurality of seals configured to at least restrict inadvertent fluid leakage into, out of, or between the first or second chambers.

8. The valve of claim 6, further comprising:
   a first pressurized fluid source configured to supply pressurized fluid to the first chamber; and
   a second pressurized fluid source configured to supply pressurized fluid to the second chamber.

9. The valve of claim 8, wherein:
   at least the first pressurized fluid source or the second pressurized fluid source includes a control valve.

10. The valve of claim 8, wherein:
    at least the first pressurized fluid source or the second pressurized fluid source includes a thermostat.

11. The valve of claim 1, further comprising:
    a guide disposed in the valve body and configured to guide the piston and the poppet.

12. A shutoff assembly for a valve having a valve body including an inlet, an outlet, and a fluid flow passage therebetween, the shutoff assembly comprising:
  a main body;
  a poppet disposed in the main body and movable between at least:
    a closed position, in which fluid is at least substantially restricted from flowing through the fluid flow passage;
    a partially open position, in which fluid is allowed to flow through the fluid flow passage at a first flow rate;
    a full open position, in which fluid is allowed to flow through the fluid flow passage at a second flow rate that is greater than the first flow rate;
  a piston disposed in the main body adjacent to the poppet, the piston moveable between a first position, in which the piston at least inhibits movement of the poppet from the closed position to the full open position, and a second position, in which the piston allows movement of the poppet from the closed position to the full open position;
  a poppet spring disposed adjacent to the poppet, the poppet spring configured to exert a poppet spring force against the poppet toward the closed position; and
  a piston spring disposed adjacent to the piston, the piston spring configured to exert a piston spring force against the piston toward the first position.

13. The shutoff assembly of claim 12, further comprising:
a piston stop coupled to the piston and configured to stop the piston when the piston has reached the first position.

14. A valve comprising:
  a valve body including an inlet, an outlet, and a fluid flow passage therebetween;
  a poppet disposed in the valve body and movable between at least:
    a closed position, in which fluid is at least substantially restricted from flowing through the fluid flow passage;
    a partially open position, in which fluid is allowed to flow through the fluid flow passage at a first flow rate; and
    a full open position, in which fluid is allowed to flow through the fluid flow passage at a second flow rate that is greater than the first flow rate;
  a piston disposed in the valve body adjacent to the poppet, the piston moveable between a first position, in which the piston at least inhibits movement of the poppet from the closed position to the full open position, and a second position, in which the piston allows movement of the poppet from the closed position to the full open position;
  a first chamber formed between the valve body and the poppet, the first chamber configured to receive pressurized fluid;
  a second chamber formed between the valve body and the piston, the second chamber configured to receive pressurized fluid;
  a poppet spring disposed adjacent to the poppet, the poppet spring configured to exert a poppet spring force against the poppet toward the closed position;
  a piston spring disposed adjacent to the piston, the piston spring configured to exert a piston spring force against the piston toward the first position; and
  a piston stop coupled to the piston and configured to stop the piston when the piston has reached the first position.

15. The valve of claim 14, further comprising:
a first pressurized fluid source configured to supply pressurized fluid to the first chamber; and
a second pressurized fluid source configured to supply pressurized fluid to the second chamber.

16. The valve of claim 15, wherein:
the first pressurized fluid source includes at least a control valve.

17. The valve of claim 16, wherein:
the second pressurized fluid source includes at least a thermostat.

* * * * *